(12) United States Patent
Mead et al.

(10) Patent No.: US 9,092,714 B1
(45) Date of Patent: Jul. 28, 2015

(54) SMART ENERGIZED TAPES FOR FOD-FREE AIRCRAFT APPLICATIONS

(71) Applicant: Northrop Grumman Systems Corporation, Falls Church, VA (US)

(72) Inventors: William T. Mead, Long Beach, CA (US); Jorge A. Millan, Lawndale, CA (US)

(73) Assignee: Northup Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/278,663

(22) Filed: May 15, 2014

(51) Int. Cl.
G06K 19/02 (2006.01)
G06K 19/08 (2006.01)
G06K 19/077 (2006.01)
G06K 19/06 (2006.01)

(52) U.S. Cl.
CPC ............ G06K 19/083 (2013.01); G06K 19/022 (2013.01); G06K 19/0614 (2013.01); G06K 19/06084 (2013.01); G06K 19/07749 (2013.01)

(58) Field of Classification Search
CPC .............. G06K 19/083; G06K 19/022; G06K 19/06084; G06K 19/0614; G06K 19/07749
USPC .................................................. 235/488, 492
See application file for complete search history.

(56) References Cited

U.S. PATENT DOCUMENTS

| | | |
|---|---|---|
| 6,478,229 B1 | 11/2002 | Epstein |
| 7,068,170 B2 | 6/2006 | Green |
| 7,264,194 B2 | 9/2007 | Gassner et al. |
| 7,466,233 B2 | 12/2008 | Drapala et al. |
| 7,477,150 B2 | 1/2009 | Renzetti et al. |
| 8,102,265 B1 * | 1/2012 | Billman ................... 340/572.4 |
| 8,330,602 B2 | 12/2012 | Ohashi et al. |
| 2004/0110026 A1 | 6/2004 | Richards et al. |
| 2013/0222610 A1 * | 8/2013 | Brahms et al. ............. 348/207.1 |

FOREIGN PATENT DOCUMENTS

| | | |
|---|---|---|
| EP | 1089220 | 4/2001 |
| WO | 2007034517 | 3/2007 |
| WO | 2008150215 | 12/2008 |

OTHER PUBLICATIONS

Sezaki, K. et al; Rolling Out RFIDs: A Lightweight Positioning Environment for Ad Hoc Applications; Sensor, Mesh and Ad Hoc Communications and Networks, 2008. Secon '08. 5th Annual IEEE Communications Society Conference on , pp. 603- 605, Jun. 16-20, 2008.
Woodard, Stanley E. et al; Method to Have Multilayer Thermal Insulation Provide Damage Detection; Journal of Spacecraft and Rockets; 2011; Nov.-Dec. 2011; vol. 48, No. 6, pp. 920-930.

* cited by examiner

*Primary Examiner* — Seung Lee
(74) *Attorney, Agent, or Firm* — Patti & Malvone Law Group, LLC

(57) ABSTRACT

A smart energized tape configured to avoid problems with foreign object damage (FOD) includes: one or more of microdots and radio frequency identification (RFID) nanochips, the one or more of microdots and nanochips configured to facilitate one or more of FOD tracking, cost control, location tracking, and asset tracking. A smart, predominantly red energized tape configured to avoid problems with FOD includes: one or more of microdots and RFID nanochips, the one or more of microdots and nanochips configured to facilitate one or more of FOD tracking, cost control, location tracking, and asset tracking, wherein the smart energized tape is one or more of fluorescent and translucent, wherein the smart energized tape is one or more of internally lit, electrically lit, and chemically detectable.

12 Claims, 3 Drawing Sheets

SMART ENERGIZED TAPES FOR FOD-FREE AIRCRAFT APPLICATIONS

STATEMENT OF GOVERNMENT RIGHTS

The Government of the United States of America has rights in this invention pursuant to Government Contract No. N00019-09-C-0019.

SUMMARY

A smart energized tape configured to avoid problems with foreign object damage (FOD) includes: one or more of microdots and radio frequency identification (RFID) nanochips, the one or more of microdots and nanochips configured to facilitate one or more of FOD tracking, cost control, location tracking, and asset tracking.

A smart, predominantly red energized tape configured to avoid problems with FOD includes: one or more of microdots and RFID nanochips, the one or more of microdots and nanochips configured to facilitate one or more of FOD tracking, cost control, location tracking, expiration date tracking, and asset tracking, wherein the smart energized tape is one or more of fluorescent and translucent, wherein the smart energized tape is one or more of internally lit, electrically lit, and chemically detectable.

A smart energized film configured to avoid problems with foreign object damage (FOD) includes: one or more of microdots and radio frequency identification (RFID) nanochips, the one or more of microdots and nanochips configured to facilitate one or more of FOD tracking, cost control, location tracking, and asset tracking.

A method for manufacturing smart energized tape includes: providing a smart energized tape comprising a thermosetting resin between prefabricated polyester sheets and configured to avoid problems with FOD; mixing one or more of RFID nanochips and microdots with the thermosetting resin between the prefabricated polyester sheets; and detecting FOD, using the one or more of RFID nanochips and microdots, during one or more of masking and removal of masking of specialty coatings.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

DETAILED DESCRIPTION

Figure 1:
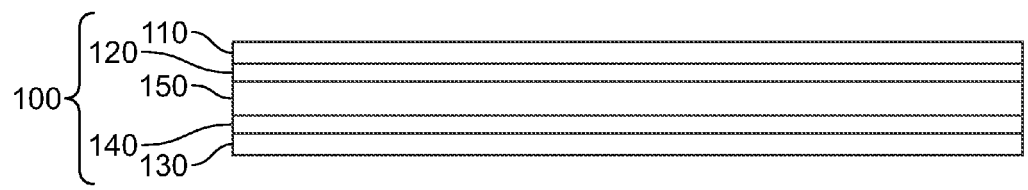
FIG. 1 is a schematic illustration of a smart energized tape 100 comprising microdots.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

According to embodiments of the invention, a smart energized tape is provided that is configured to avoid problems with foreign object damage (FOD). Commonly, though not necessarily, the smart energized tape may be used in airplane applications. The smart energized tape is one or more of laminated and composite. The smart energized tape is one or more of internally lit, electrically lit, and chemically detectable, thereby promoting visibility of one or more of the smart energized tape and the smart energized tape edges. For example, when placed on an aircraft, the smart energized tape is one or more of internally lit, electrically lit, and chemically detectable.

According to further embodiments of the invention, the smart energized tape comprises one or more of embedded nanochips and embedded microdot sensors to facilitate one or more of FOD tracking, cost control, location tracking, and asset tracking. For example, tapes can be programmed for specific cost centers. For example, tapes can be assigned to specific mechanics.

According to embodiments of the invention, the smart energized tape comprises an adherent backing material. The adherent backing material can comprise polyester. The adherent backing material can cut through specialty coatings. According to embodiments of the invention, the smart energized tape leaves no significant residue on the surface. If any residue does remain, it is easily visible due to one or more of the fluorescence of the smart energized tape and the one or more of nanochips and microdots that are embedded in the smart energized tape.

According to other embodiments of the invention, the smart energized tape comprises one or more electronic sensors. The electronic sensors detect the smart nanochips and thereby locate one or more of debris and residue removed after demasking, even in places of limited accessibility.

According to further embodiments of the invention, the smart energized tape has a width of between approximately one inch and approximately two inches.

According to other embodiments of the invention, a smart energized film is provided that is configured to avoid problems with FOD. Commonly, though not necessarily, the smart energized film may be used in airplane applications. The smart energized film is one or more of laminated and composite. The smart energized film is one or more of internally lit, electrically lit, and chemically detectable. For example, when placed on an aircraft, the smart energized film is one or more of internally lit, electrically lit, and chemically detectable.

According to other embodiments of the invention, paint lamination is employed in manufacturing the smart energized tape in cases where the material can withstand characteristic temperatures for autoclave curing of approximately 350° F. If temperatures are not anticipated to reach this approximate level, paints our dried in bake ovens, for example, at a temperature of approximately 160° F.

The smart energized tape is visually identifiable as one or more of fluorescent, red, and translucent and accordingly is readily visible and any wicking of the uncured resin can be readily seen. To minimize or eliminate FOD, the smart energized tape can be electronically detected via one or more of embedded, programmable nanochips and embedded, programmable microdots. Translucence allows viewing what is under the smart energized tape. The fluorescence allows easy black light detection.

According to further embodiments of the invention, the smart energized tape comprises a high strength polyester backing material that cuts through overlaying cured coatings with a clean perpendicular edge without entrapping coating material under the paint. Moreover, the smart energized tape is readily detectable by one or more of electronic detection and fluorescence. Accordingly, the escape probability for the smart energized tape FOD is minimal.

According to additional embodiments of the invention, the smart energized tape has an inherent tensile strength of at least 25 pounds per inch (25 lbs/inch). Commonly, although not necessarily, the smart energized tape has an inherent tensile strength of approximately 50 pounds per inch (50 lbs/inch). Commonly, although not necessarily, the smart energized tape has an adhesive strength equal to or greater than approximately 42 ounces per inch for easy removal by hand. The smart energized tape has a tensile strain less than or equal to approximately 1%. The smart energized tape has a Poisson's ratio of approximately 0.5. The longitudinal strain produced by the cutting action of tape through the cured coating is transferred to the multilayered structure of the adhesive.

According to additional embodiments of the invention, the smart energized tape has a thickness between approximately three mils and approximately six mils. The thickness of the smart energized tape is typically 5 mils thick. A typical adhesive thickness is approximately 1.5 mils. The smart energized tape comprises an adherent polyestser backing material that may cut cured epoxy coatings of a thickness up to approximately 0.08".

According to other embodiments of the invention, the smart energized tape is red. The smart energized tape may be resistant to one or more of solvents and heat. For example, one or more of the smart energized tape and the adhesive are resistant to solvents commonly used to clean aircraft surfaces, for example, one or more of Turco 4460, Ardrox 5515, Desoclean 45, and acetone. The smart energized tape comprises an adherent high strength polyester backing material that efficiently cuts through cured shim. For example, the smart energized tape efficiently cuts through 0.06 inch thickness of Hysol EA9394, a glassy amorphous polymer.

According to further embodiments of the invention, the smart energized tape can undergo at least three thermal cycles between room temperature and approximately 160° F. without significant elongation and without leaving adhesive residue on the structure surface. Also after the three thermal cycles, the smart energized tape has sufficient adhesion to undergo other processes.

FIG. 1 is a schematic illustration of a smart energized tape 100 comprising microdots. The smart energized tape 100 comprises an adherent backing 110 located on the top of the smart energized tape that provides strength. In this example, the thickness of the adherent backing 110 is approximately 2 mils. The adherent backing 110 may comprise polyester to provide strength. The smart energized tape 100 further comprises an upper microdot containment sheet 120 that is affixed to the adherent backing 110. In this example, the thickness of the upper microdot containment sheet 120 is approximately 0.5 mils. The smart energized tape 100 further comprises a pressure-sensitive adhesive layer 130 located on the bottom of the smart energized tape 100 and configured for bonding to a structure surface. In this example, the thickness of the pressure-sensitive adhesive layer 130 is approximately 0.5 mils. The smart energized tape 100 further comprises a lower microdot containment sheet 140 that is affixed to the pressure-sensitive adhesive layer 130. In this example, the thickness of the lower microdot containment sheet is approximately 0.5 mils. Between the upper microdot containment sheet 120 and the lower microdot containment sheet 140, the smart energized tape 100 further comprises one or more layers 150 of microdots that are layered into place.

Figure 2:
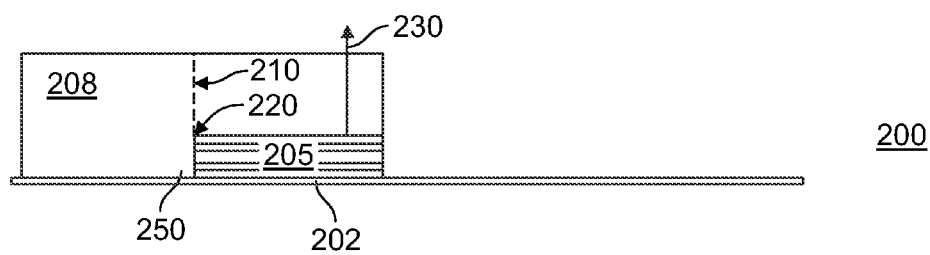
FIG. 2 is a schematic illustration showing the removal of one or more of a smart energized tape and a cured coating left in previous applications.

FIG. 2 is a schematic illustration 200 showing the removal from a structure surface 202 of one or more of a smart energized tape 205 and a shim 208 left in previous applications. The shim 208 typically, although not necessarily, comprises a cured epoxy material. For example, the shim 208 comprises a cured, glassy amorphous polymer material.

The smart energized tape 205 comprises a clean cutting edge 210. The smart energized tape 205 further comprises a clean cutting corner 220. Removal of the smart energized tape 205 can be easily accomplished via a hand applied force 230, thereby leaving no residue on the structure surface 202 as one or more of the clean cutting edge 210 and the clean cutting corner 220 cuts through the shim 208. The smart energized tape 205 comprises one or more layers of one or more of nanochips and microdots, which are mixed between very thin prefabricated polyester sheets with a thermosetting resin. Alternatively, the polyester sheets may not be prefabricated. Alternatively, the sheets may comprise a material other than polyester. For example, the thermosetting resin may be a thermosetting polyester resin. For example, the thermosetting resin may be a thermosetting epoxy. For example, the thermosetting resin may be an adhesive epoxy. No tape FOD is left embedded at any point 250 in the shim 208, and no FOD is left embedded in the structure surface 202.

Figure 3:
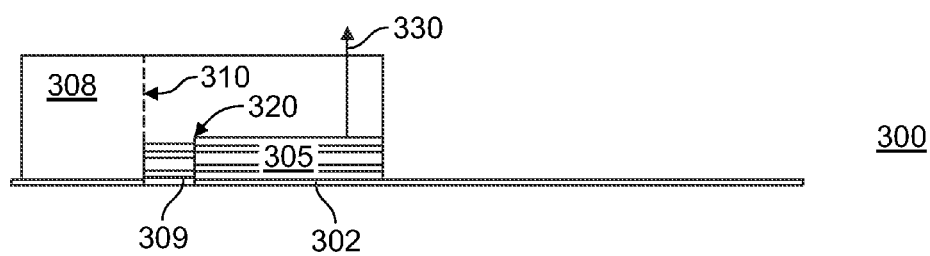
FIG. 3 is a schematic illustration showing the removal from a structure surface 302 of one or more of a smart energized tape, a shim left in previous applications, and foreign object damage (FOD) left in the shim in previous applications and easily removed.

FIG. 3 is a schematic illustration 300 showing the removal from a structure surface 302 of one or more of a smart energized tape 305, a shim 308 left in previous applications, and foreign object damage (FOD) 309 left in the shim 308 in previous applications and easily removed using embodiments of the invention. The shim 308 typically, although not necessarily, comprises a cured epoxy material. For example, the shim 308 comprises a glassy amorphous polymer material.

The smart energized tape 305 comprises a clean cutting edge 310. The smart energized tape 305 further comprises a clean cutting corner 320. Removal of the smart energized tape 305 can be easily accomplished via a hand applied force 330, thereby leaving no residue on the structure surface 302 as one or more of the clean cutting edge 310 and the clean cutting corner 320 cuts through the shim 308.

The smart energized tape 305 comprises one or more layers of one or more of nanochips and microdots, which are mixed between very thin prefabricated polyester sheets with a thermosetting resin. The FOD 309 can be easily located and removed by the user using the one or more of nanochips and microdots. Accordingly, once the process is completed, despite the temporary presence of the FOD 309, no FOD 309 is left embedded on the structure surface 302, and no FOD 309 is left embedded in the shim 308.

FIGS. 4A-4E are a series of schematic illustrations showing use of a smart energized appliqué placed on a structure surface and its ability to remove excess cured shim.

Figure 4A:
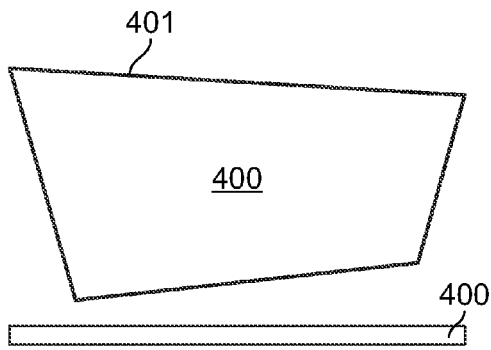
FIGS. 4A-4E are a series of schematic illustrations showing a smart energized appliqué placed on a structure surface and its ability to remove excess cured shim.

FIG. 4A is a schematic illustration of a structure surface 400 on which a smart energized appliqué (not shown) will be placed and used to remove excess cured shim (not shown). The structure surface 400 defines a structure surface border 401. Two views of the structure surface 400 are shown, a top view and a side view at the bottom of the page. The structure surface 400 is irregularly shaped as will often be the case in practice. The structure surface 400 may, for example, be a small portion of the inside surface of an aircraft. The structure surface may, for example, be an inner surface of a vertical composite skin. The structure surface 400 may, for example, be a small portion of the inside surface of a structure other than an aircraft.

Figure 4B:
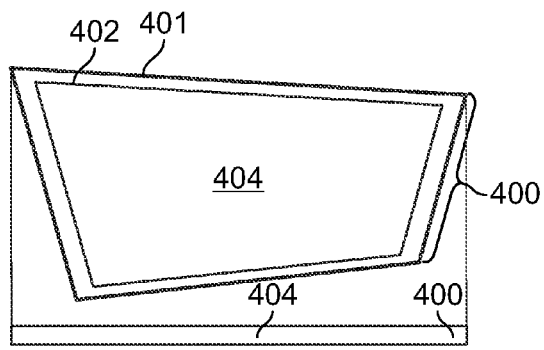

FIG. 4B is a schematic illustration of the structure surface 400 and the preparation of the structure surface 400 for receiving the smart energized appliqué (not shown). Again the structure surface 400 defines the structure surface border 401. Two views of the structure surface 400 are shown, a top view and a side view at the bottom of the page, with guide lines included to illustrate corresponding corners in the two views. It is useful to have the ability to lay down the smart energized appliqué by hand onto a specified location on the underlying structure surface 400. The intended location for the smart energized appliqué may, for example, be indicated via a masking line 402 drawn by the user on the structure surface 400 using a Sharpie pen or another marking pen and a masking template 404. In this example, the masking line 402 is drawn along the outer edge of the masking template 404.

Figure 4C:
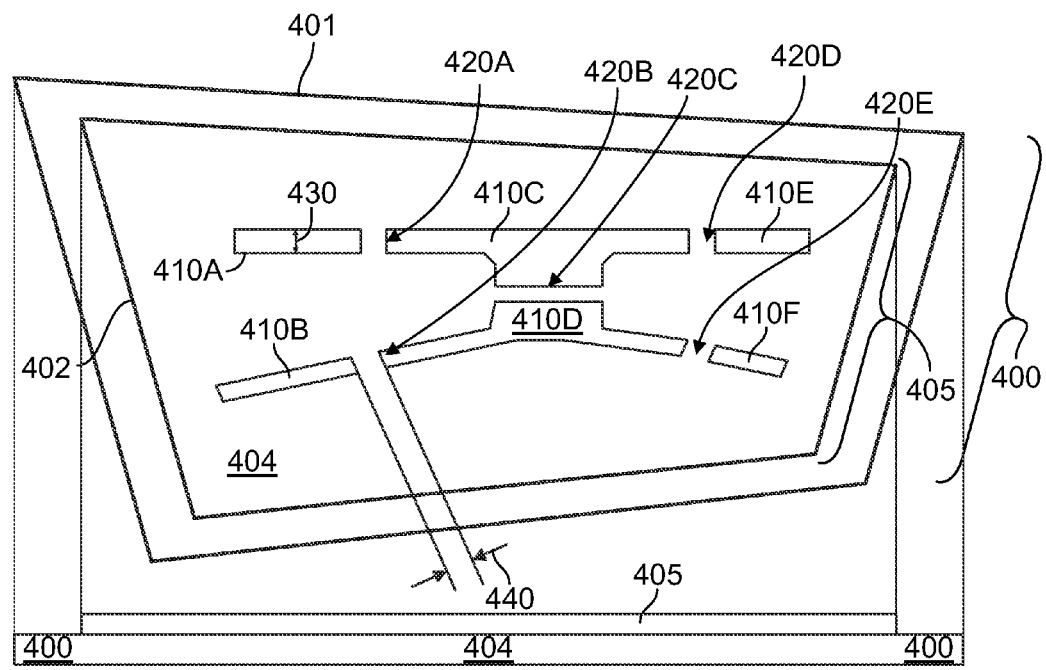

FIG. 4C is a schematic illustration of the smart energized appliqué 405 placed on the structure surface 400 using the masking line 402. Again the structure surface 400 defines the structure surface border 401. Two views of the smart energized appliqué 405 placed on the structure surface 400 are shown, a top view and a side view at the bottom of the page, with guide lines included to illustrate corresponding corners in the two views. Using the masking template 404 as described above, the smart energized appliqué 405 is placed on the structure surface 400 so that the smart energized appliqué 405 can later remove the excess shim (not visible here but visible in FIG. 4D). The smart energized appliqué 405 can be rapidly adhered to the structure surface 400, matching the drawn masking line 402 from the masking template 404 over substantially the entire area of the structure surface 400. Optionally, a squeegee or similar device can be employed to squeeze out any potentially trapped air bubbles comprised in the smart energized appliqué 405, ensuring that there is no leak path for the liquid shim to wick under the smart energized appliqué 405.

The smart energized appliqué 405 is manufactured from the same or similar material as the smart energized tape. The smart energized appliqué 405 covers large areas of the structure surface 400. The smart energized appliqué 405 comprises slots 410A-410F and bridges 420A-420E. In this figure, slots 410C and 410D are larger than the other slots 410A, 410B, 410E, and 410F. A typical width 430 of a representative slot 410A is approximately 0.10 inches.

Separating two or more of the slots 410A-410F from one another and supporting one or more of the slots 410A-410F are bridges 420A-420E. For example, as pictured in FIG. 4C, bridge 420A separates slot 410A from slot 410C, supporting one or more of slots 410A and 410C. Bridge 420B separates slot 410B from slot 410D, supporting one or more of slots 410B and 410D. The bridge 420C separates the larger slot 410C from the larger slot 410D, supporting one or more of slots 410C and 410D and facilitating the laying down of the smart energized appliqué 405 by a user without buckling or wrinkling. Bridge 420D separates slot 410C from slot 410E, supporting one or more of slots 410C and 410E. Finally, bridge 420E separates slot 410D from slot 410F, supporting one or more of slots 410D and 410F. The slots 410A-410F allow fast removal of the smart energized appliqué 405 and of excess shim while allowing stiffness of the appliqué for easy overlay on the structure. A typical width 440 of a representative bridge 420B is approximately 0.38 inches.

Smart energized appliqués 405 may be used for one or more of flat, simple radial contours and double radial contours by providing in the smart energized appliqué 405 one or more of cutouts and windows to prevent one or more of buckling and wrinkling at the edges of the smart energized appliqué 405. The smart energized appliqué 405 eliminates problems associated with thickness buildup due to overlapping tapes at corners.

Figure 4D:
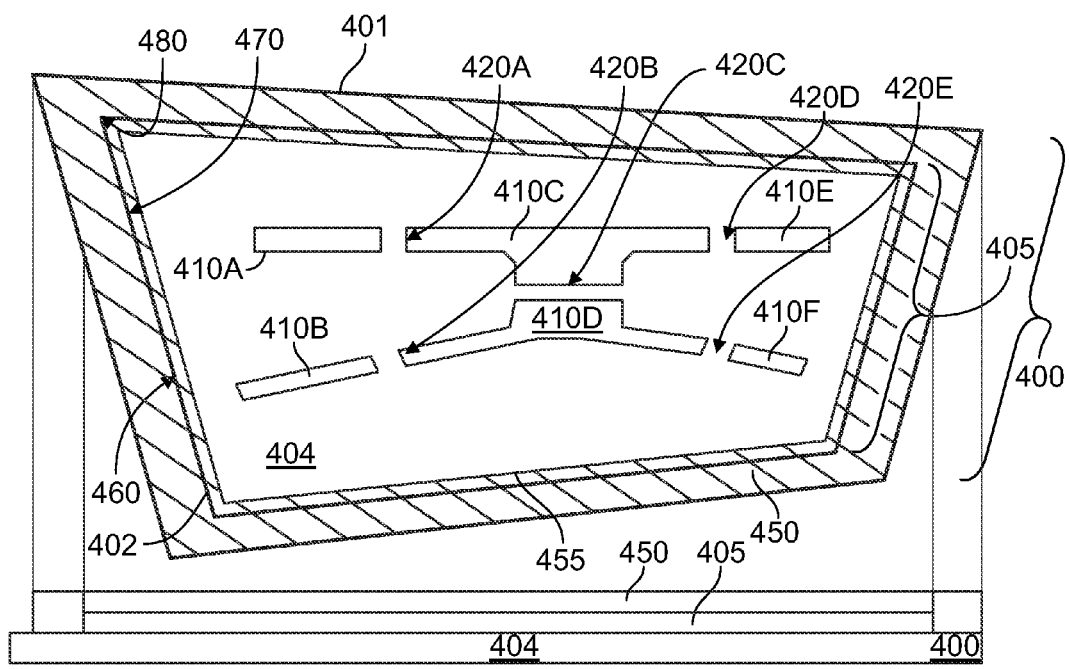

FIG. 4D is a schematic illustration of the smart energized appliqué 405 placed on the structure surface 400 and its ability to remove cured shim 450. Again the structure surface 400 defines the structure surface border 401. Two views of the smart energized appliqué 405 placed on the structure surface 400 and the shim 450 are shown, a top view and a side view at the bottom of the page, with guide lines included to illustrate corresponding corners in the two views. The smart energized appliqué 405 comprises the slots 410A-410F and the bridges 420A-420E. The masking line 402 is now hidden beneath the smart energized appliqué 405 and thus is depicted as a dotted masking line 402. The masking line 402 now marks the edges of the smart energized appliqué 405 and thus is now used to help guide the application of a liquid shim 450, which is applied by the user on top of the dotted masking line 402. The liquid shim 450 is applied over the structure surface, starting at the structure surface border 401. The liquid shim 450 is prevented from extending beyond the structure surface border 401 by one or more of the edges of an adjacent smart energized appliqué (not shown) and a structure boundary. The liquid shim flows over the smart energized appliqué 405, extending a bit over the edges of the smart energized appliqué 405 up to the shim inner boundary 455. The edges of the smart energized appliqué 405 define a stayout area 404 that roughly coincides with the outline of the masking template 404 and into which the shim 450 is not allowed to substantially penetrate.

After application, the shim 450 is allowed to cure. For example, the shim 450 is allowed to cure for approximately twenty-four hours. Typically, although not necessarily, the cured shim 450 comprises a cured epoxy material. For example, the cured shim 450 comprises a glassy amorphous polymer material. The cured shim 450 typically comprises a cured shim edge 460.

Excess cured liquid shim 450 is removed by the smart energized appliqué 405 when the smart energized appliqué 405 is removed from the structure surface 400. The smart energized appliqué 405 comprises a clean cutting edge 470 that overlays on the masking line 402. The smart energized appliqué 405 further comprises a clean cutting corner 480. Removal of the smart energized appliqué 405 can be easily accomplished via a hand applied force, thereby leaving no residue as one or more of the clean cutting edge 470 and the clean cutting corner 480 cuts through the cured shim edge 460. No tape FOD is left embedded at any point in the cured shim 450, and no FOD is left embedded in the structure surface 400.

One or more of the slots 410A-410F provide guided tear patterns to help guide the user so that the smart energized appliqué 405 may be readily removed along with the cured shim edge 460. The smart energized appliqué 405 comprises an adherent high strength polyester backing material (not shown) that efficiently cuts through the cured shim 450. The smart energized appliqué 405 eliminates problems associated with thickness buildup due to overlapping tapes at corners.

One or more of the slots 410A-410F are configured to provide the user with access by hand to facilitate one or more of tearing and removal of the smart energized appliqué 405. One or more of the slots 410A-410F allow the user to have easy access to the smart energized appliqué 405, which can be cut with a plastic knife, so that both the smart energized appliqué 405 and the shim can be readily removed by pulling up around the borders of each smart energized appliqué 405.

Figure 4E:
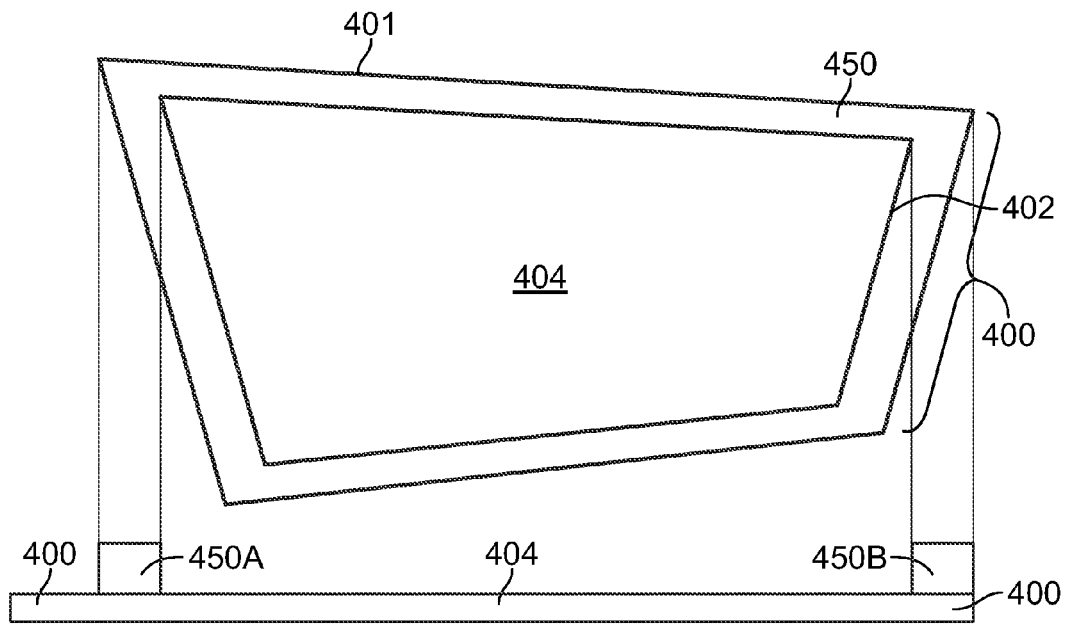

FIG. 4E is a schematic illustration of the structure surface 400 following removal of the smart energized appliqué 405 and of the remaining cured shim 450. Again the structure surface 400 defines the structure surface border 401. Two views of the structure surface 400 and the remaining cured shim segments 450A and 450B are shown, a top view and a side view at the bottom of the page, with guide lines included to illustrate corresponding corners in the two views. It should be noted that cured shim segments 450A and 450B are in fact joined together as part of the remaining cured shim 450.

According to embodiments of the invention, the adhesive used by one or more of the smart energized tape and the smart energized appliqué does not comprise tackifiers, so there is zero or negligible residue after heating in the bake oven. For example, the adhesive can be an acrylic adhesive. The smart energized tape obtains its adhesive properties from the viscoelastic properties of the rubberlike material. The smart energized tape can also be electronically detected by programmable microdots, which can be detected for FOD elimination. The programmed information can include supplier details such as the expiration date of the smart energized tape.

According to further embodiments of the invention, the smart energized tape may also comprise one or more layers of one or more of nanochips and microdots, which are mixed between very thin prefabricated polyester sheets with a thermosetting resin. The one or more of nanochips and microdots form a passive layer to be energized with an electromagnetic wave for purposes of one or more of detection, power receiving and power transmission. To maximize ductility of the sandwiched nanochip sheet, the thickness of the sheet comprising the one or more of nanochips and microdots is extremely small. For example, the thickness of the sheet comprising the one or more of nanochips and microdots is less than approximately 0.001". Accordingly, the sheet comprising the one or more of nanochips and microdots is pliable rather than brittle.

The Hitachi "Powder"/"Dust" μ-Chip Micro RFID chip utilizes silicon-onInsulator thin chip fabrication technology to reduce the distance between each individual circuit element, and, using an embedded antenna, can be applied to detect FOD. The nanochips ensure detection since the length of tape used is typically several hundred thousand feet for multiple aircraft surfaces and the risk of embedding one piece of tape, say 0.5 inches is always prevalent.

According to yet other embodiments of the invention, the smart energized tape has a tensile strength of at least 25 pounds per inch, with a tensile strain less than 1%. Accordingly, the smart energized tape does not yield when the shim is cut.

According to embodiments of the invention, a portable nanochip sensor locates FOD embedded under the surface. The detection frequency of the nanochips has to be sufficiently different from the coating's absorption frequency.

According to embodiments of the invention, the smart energized tape may comprise an appliqué configured to remove coating over larger areas than are typically treated with tape. Put simply, appliqués are an application of smart energized tapes for large areas.

Appliqués may have a width up to approximately 5 feet. Appliqués may have a length up to approximately ten feet. Individual appliqués may be located on structure or one large appliqué may be used by removing the backing of all the individual appliqués.

Various methods of manufacturing are available for smart energy tape comprising nanochips. The nanochips can be mixed with resin when the smart energized tape is made. Alternatively, or additionally, the nanochips can be mixed with a thermosetting resin by layering the nanochips through a thin thermosetting sheet with a thickness on the order of a thousandth of an inch. The nanochips are then sandwiched tightly enough between adhesive layers that they do not become appreciably brittle due to one or more of transverse stress to accept strains and transfer stress.

As a user pulls on the smart energized tape, the transfer stress operates longitudinally. Because the nanochips and the thermosetting resin are bonded together, the connection between them holds right down to the adhesive layer. Consequently, when the smart energy tape is removed, the layers come off cleanly. That is, the longitudinal strain is transformed to lateral strain on the smart energized tape. The result is a very clean ninety-degree corner comprising a sharp edge like the blade of a cutting knife.

Application of the smart energized tape cuts any overlaying epoxy or elastomeric materials of up to approximately 0.1 inches in thickness. So as to cut cleanly without tearing or leaving FOD, after thermal cycling, the overlaying materials go through three bake oven cycles to 160° F. to cure the material. For example, the overlaying materials may be one or more of elastomeric, polyurethane, and epoxy.

Figure 5:
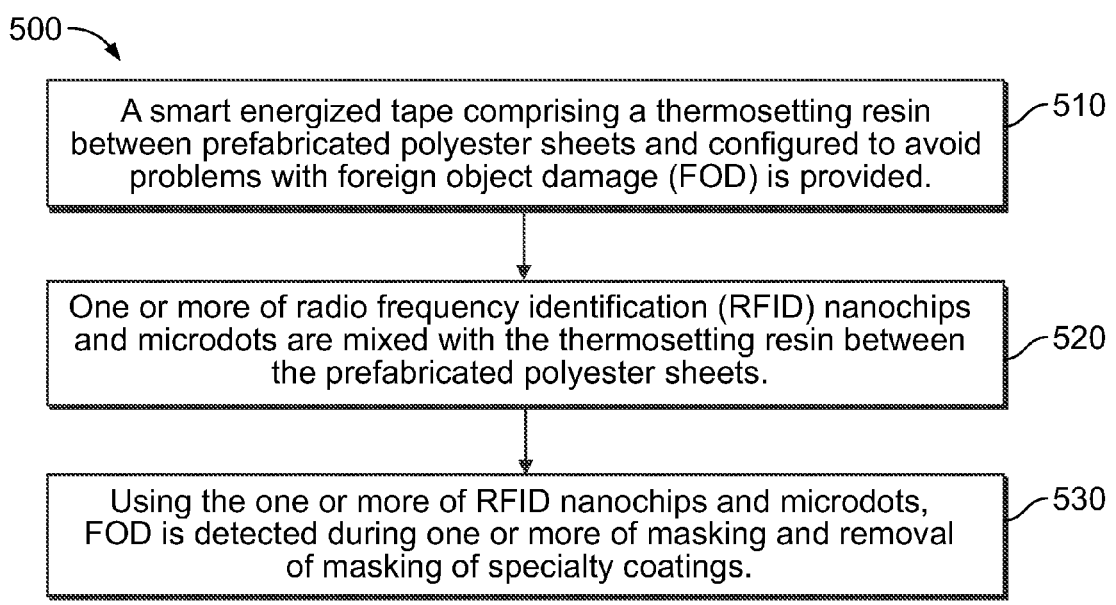
FIG. 5 is a flowchart of a method for manufacturing smart energized tape comprising nanochips.

FIG. 5 is a flowchart of a method 500 for manufacturing smart energized tape comprising one or more of nanochips and microdots. The order of the steps in the method 500 is not constrained to that shown in FIG. 5 or described in the following discussion. Several of the steps could occur in a different order without affecting the final result.

In method step 510, a smart energized tape comprising a thermosetting resin between prefabricated polyester sheets and configured to avoid problems with foreign object damage (FOD) is provided. Block 510 then transfers control to block 520.

In method step 520, one or more of radio frequency identification (RFID) nanochips and microdots are mixed with the thermosetting resin between the prefabricated polyester sheets. The one or more of RFID nanochips and microdots are brush coated on the surface of the prefabricated polyester sheets. The mixing process may be a low shear mixing process. Block 520 then transfers control to block 530.

In method step 530, FOD is detected during one or more of masking and removal of masking of specialty coatings. Block 530 then terminates the process.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain fabrication steps and certain components can be altered without substantially impairing the functioning of the invention. For example, instead of being red, the smart energized tape can be another color, preferably although not necessarily another bright, easily visible color. For example, the polyester sheets may not be prefabricated. For example, the sheets may comprise a material other than polyester. For example, the thermosetting resin may be a thermosetting polyester resin. For example, the thermosetting resin may be a thermosetting epoxy. For example, the thermosetting resin may be an adhesive epoxy.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

We claim:

1. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, wherein the smart energized tape is one or more of fluorescent and translucent to facilitate tape laydown on the masking line.

2. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, wherein the smart energized tape is one or more of internally lit, electrically lit, and chemically detectable.

3. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, wherein the nanochips comprise one or more of programming and data storage.

4. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, wherein removal of the smart energized tape produces a clean, approximately 90-degree corner without tearing of the smart energized tape, wherein the one or more of microdots and nanochips are comprised in one or more of an adherent for the smart energized tape and an adhesive for the smart energized tape.

5. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, wherein no residue of the one or more of the adherent and the adhesive remains after the removal of the smart energized tape, wherein the one or more of microdots and nanochips are comprised in one or more of an adherent for the smart energized tape and an adhesive for the smart energized tape.

6. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, further comprising one or more laser cut serrations that are cut to a depth to promote support of a large sheet and rapid tearing to remove the smart energized tape and excess coating, wherein the smart energized tape comprises a smart energized appliqué.

7. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, further comprising one or more slots for use for removal of the appliqué, wherein the smart energized tape comprises a smart energized appliqué.

8. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, further comprising one or more slots for use for removal of the appliqué, further comprising one or more bridges interconnected with the one or more slots, wherein the smart energized tape comprises a smart energized appliqué.

9. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, further comprising one or more slots for use for removal of the appliqué, further comprising laser cut perforations configured to provide guided tear patterns so the border of the appliqué may be readily removed along with the cured shim coating material, wherein the smart energized tape comprises a smart energized appliqué.

10. A smart energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, expiration date tracking, and asset tracking, wherein the nanochips are comprised in one or more layers, the layers being coated as a thermosetting resin.

11. A smart, predominantly red energized tape configured to avoid problems with foreign object damage (FOD) comprising:
one or more of microdots and radio frequency identification (RFID) nanochips, the one or more of microdots and nanochips configured to facilitate one or more of FOD tracking, cost control, location tracking, and asset tracking,
wherein the smart energized tape is one or more of fluorescent and translucent,
wherein the smart energized tape is one or more of internally lit, electrically lit, and chemically detectable.

12. A method for manufacturing smart energized tape, comprising:
providing a smart energized tape comprising a thermosetting resin between prefabricated polyester sheets and configured to avoid problems with foreign object damage (FOD);
mixing one or more of radio frequency identification (RFID) nanochips and microdots with the thermosetting resin between the prefabricated polyester sheets; and detecting FOD, using the one or more of RFID nanochips and microdots, during one or more of masking and removal of masking of specialty coatings.

* * * * *